(12) United States Patent
Mandal et al.

(10) Patent No.: US 6,983,465 B2
(45) Date of Patent: *Jan. 3, 2006

(54) METHOD AND APPARATUS FOR MANAGING DATA CACHING IN A DISTRIBUTED COMPUTER SYSTEM

(75) Inventors: Chhandomay Mandal, Nashua, NH (US); Mark J. Musante, Westford, MA (US); Peter J. Wagener, Somerville, MA (US); Jillian I. Dacosta, Nashua, NH (US); Roberta A. Pokigo, Billerica, MA (US); Melora L. Goosey, Andover, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 09/975,485

(22) Filed: Oct. 11, 2001

(65) Prior Publication Data

US 2003/0088713 A1    May 8, 2003

(51) Int. Cl.
G06F 9/46          (2006.01)
(52) U.S. Cl. .................. 719/320; 321/328; 703/23; 703/26; 703/27
(58) Field of Classification Search ................ 719/320, 719/321, 328; 703/23, 26–27; 707/100, 707/200
See application file for complete search history.

(56) References Cited

U.S. PATENT DOCUMENTS 6,205,415 B1 *   3/2001  Butts et al. ................... 703/27
6,298,478 B1 *  10/2001  Nally et al. .................. 717/170
6,332,163 B1 *  12/2001  Bowman-Amuah ......... 709/231
6,757,708 B1 *   6/2004  Craig et al. .................. 709/203

OTHER PUBLICATIONS

Anonymous, "Core plans first quarter release of T27 and UTS Java emulators", Jan. 2000, Unisys World, vol. 21, pp. 1-2.*

* cited by examiner

Primary Examiner—Meng-Al T. An
Assistant Examiner—Phuong N. Hoang
(74) Attorney, Agent, or Firm—Kudirka & Jobse, LLP

(57) ABSTRACT

A three-tiered data caching system is used on a distributed computer system comprising hosts connected by a network. The lowest tier comprises management facade software running on each machine that converts a platform-dependent interface written with low-level kernel routines that actually implement the data caching system to platform-independent method calls. The middle tier is a set of federated Java beans that communicate with each other, with the management facades and with the upper tier of the system. The upper tier of the inventive system comprises presentation programs that can be directly manipulated by management personnel to view and control the system. In one embodiment, the federated Java beans can run on any machine in the system and communicate, via the network. A data caching management facade runs on selected hosts and at least one data caching bean also runs on those hosts. The data caching bean communicates directly with a management GUI or CLI and is controlled by user commands generated by the GUI or CLI. Therefore, a manager can configure and control the data caching system from a single location.

25 Claims, 14 Drawing Sheets

FIG. 7

StorEdge Data Services Console: Solaris Management Console 2.0 EA

Console  Exit  View  Go  Help

Toolbox  http://downtown:898/toolboxes/DataServicesConsole.tbx#Data Service Stations/Station0 /Data Service CacheFast Write Cache/ — Jdacosta Navigation

- Data Service Stations
  - Station 0
    - Data Service Volumes
      - Local Volumes
      - Exported Volumes
    - Data Service Cache
      - Cache Statistics
      - Fast Write Cache
    - Data Service Applicatio
  - Station 1
  - Station 2
  - Station 3
  - Station 4
  - Station 5
  - Station 6
  - Station 7

Status: Nvram Cards are operating normally — 722

| Nvram 0 | | Nvram 1 | |
|---|---|---|---|
| Properties | Values | Properties | Values |
| Device ID | NVRAM0 | Device ID | NVRAM0 |
| Software Version | 2 | Software Version | 2 |
| Hardware Version | 0 | Hardware Version | 0 |
| Board Size | 32MB | Board Size | 32MB |
| Card Instance | 0 | Card Instance | 0 |
| Bus Instance | pci#0 | Bus Instance | pci#0 |
| Card Status | Active | Card Status | Active |
| Dirty Bit | 1 | Dirty Bit | 1 |
| Battery Status | Good | Battery Status | Good |
| Uncorrectable Errors | 0 | Uncorrectable Errors | 0 |
| Correctable Errors | 0 | Correctable Errors | 0 |
| Mirror ID | NVRAM1 | Mirror ID | NVRAM0 |

Information

Fast Write Cache — This tool allows you to manage your Fast Write Cache data service Context Help  Console Log 0 Item(s)

METHOD AND APPARATUS FOR MANAGING DATA CACHING IN A DISTRIBUTED COMPUTER SYSTEM

FIELD OF THE INVENTION

This invention relates to management of networked computer systems and to data services, such as data caching and, in particular, to distributed management of data caching equipment and software in connection with such services.

BACKGROUND OF THE INVENTION

It is common in many contemporary computer systems to require rapid access to stored information. One method of decreasing the time taken to access stored information is to use disks capable of high-speed input and output operations. Alternatively, a multiple disk array, called a Redundant Array of Inexpensive Disks (RAID) can be used. In such arrays, the multiple drives can be concatenated into one logical storage unit. When this is done, the storage space of each drive can be divided into "stripes." These stripes are then interleaved round robin, so that the combined storage space is composed alternately of stripes from each drive. It is then possible to optimize performance by striping the drives in the array with stripes large enough so that each data record can fall entirely within one stripe or by arranging the stripe size so that a data record spans all of the disks in a single stripe. This allows the drives to work simultaneously on different I/O operations, and thus maximizes the number of simultaneous I/O operations that can be performed by the array.

Alternatively, a caching system can be used. In such a system, large capacity disks are used to store data that is not of continuous interest. When such data is requested, it is moved from the disks to a much faster, more expensive and, consequently, more limited in capacity, medium such as a random access or RAM memory (which may be non-volatile RAMS or NVRAMs for reliability purposes.) This faster medium is called a cache memory and the process is called data caching. The use of a faster medium produces performance gains under the generally valid assumption that, once data has been accessed, it will be accessed again in the near future (known as temporal localization.) In addition, data is typically transferred in blocks in the caching system because it has been found that data access patterns hold spatial localization as well.

The next time data is requested during a read operation, the storage system first checks the cache memory to determine if the requested data is stored there. If the data is in the cache memory, the data is retrieved directly from the cache memory without accessing the slower disks. If the data is not in the cache memory, then the slower disks are accessed to retrieve the data. The retrieved data may be added to the cache memory at that time so that it will be available if requested again.

A similar process is performed during a data write operation. In particular, data to be written is first written into the cache memory and the write is then acknowledged. The data in the cache memory is then later asynchronously written to the underlying disks using some algorithm to decide the order in which the data in the cache memory is written to the disks. This latter process is called "destaging."

Cache memories can also be used in connection with RAID systems. In such RAID systems performance gains can be obtained by coalescing small sequential RAID writes in order to turn them into full-stripe writes, thereby increasing throughput and response time.

In a large, distributed computer system connected by a network, management personnel and resources typically manage the system from a system console. However, the data caching software, which actually controls the data caching services, is typically comprised of low-level routines that are part of an operating system kernel running on a particular machine. These routines must run on that machine and must be written in platform-dependent language. Thus, prior art systems required a manager to physically log onto each local host in a distributed system in order to discover the caching facilities on that local host and set up the caching process.

SUMMARY OF THE INVENTION

In accordance with the principles of the invention, a three-tiered data caching system is used on a distributed computer system connected by a network. The lowest tier comprises management facade software running on each machine that converts the platform-dependent interface written with the low-level kernel routines to platform-independent method calls. The middle tier is a set of federated Java beans that communicate with each other, with the management facades and with the upper tier of the system. The upper tier of the inventive system comprises presentation programs that can be directly manipulated by management personnel to view and control the system.

In one embodiment, the federated Java beans can run on any machine in the system and communicate, via the network. A data caching management facade runs on selected hosts and at least one data caching bean also runs on those hosts. The data-caching bean communicates directly with a management GUI or CLI and is controlled by user commands generated by the GUI or CLI. Therefore, a manager can configure the entire data caching system from a single location and can cache individual volumes "on the fly" during ongoing data processing operations.

In another embodiment, another bean stores the configuration of the data replication system. This latter bean can be interrogated by the data-caching bean to determine the current system configuration.

In still another embodiment, a data service volume bean locates and prepares volumes that can be used by the data caching system.

In yet another embodiment the presentation programs include a set of management graphic user interfaces (GUIs)

In another embodiment, the presentation programs include command lines interfaces (CLIs).

BRIEF DESCRIPTION OF THE DRAWINGS

The above and further advantages of the invention may be better understood by referring to the following description in conjunction with the accompanying drawings in which:

FIG. 7 is a screen shot of a screen display generated by a graphic user interface showing property values for NVRAM boards.

DETAILED DESCRIPTION

Figure 1:
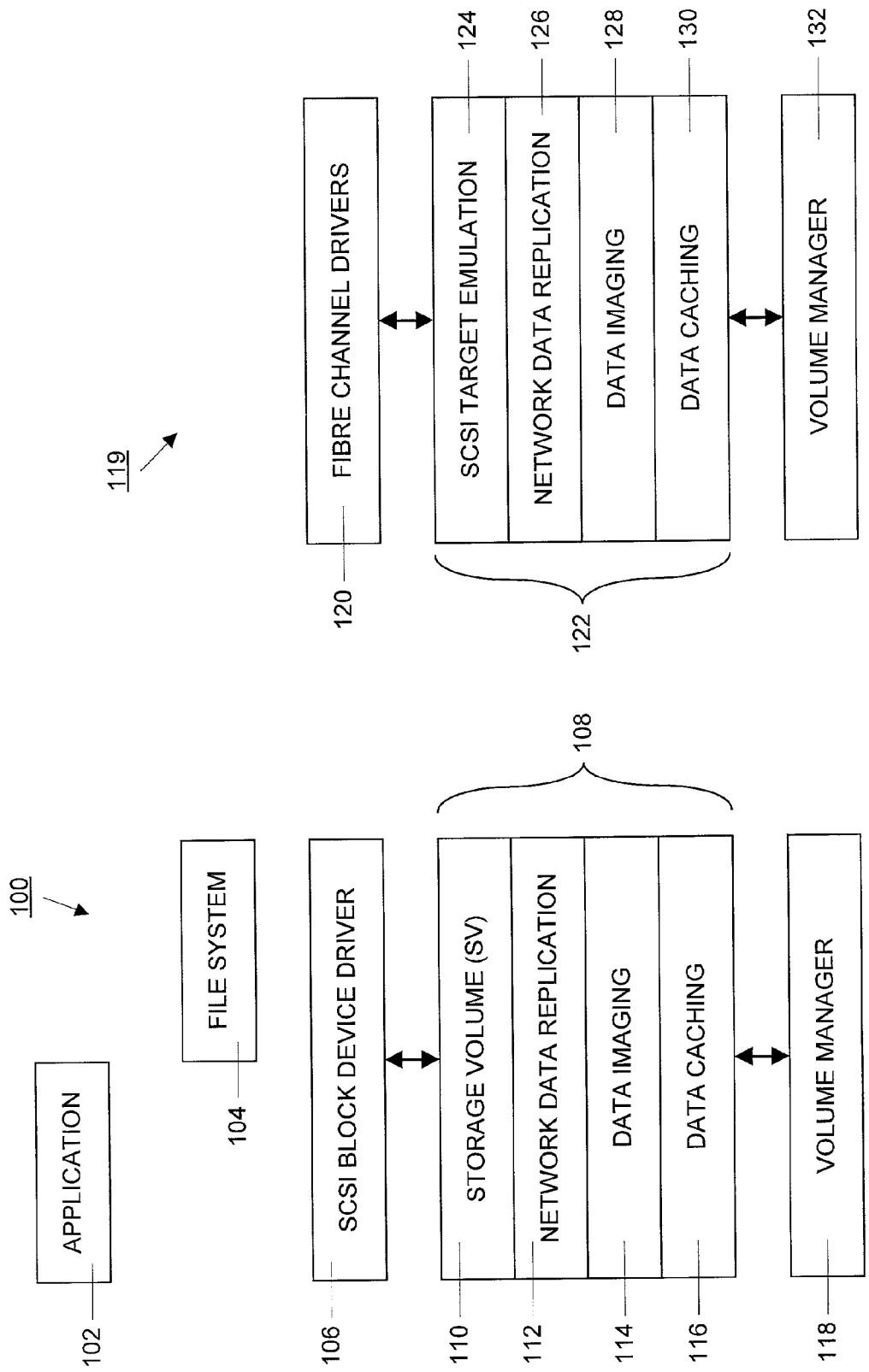
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

Data Services are software products that consist of two parts: a set of kernel drivers, which provides the actual service on the local platforms, and the user level management software. The kernel drivers reside in the host memory and would generally be implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

As shown in FIG. 1A, in the memory of an application server 100, the data service kernel modules 108 layer within the operating system I/O stack above volume manager 118 and below the disk device drivers 106. The data service kernel modules include a storage volume module 110 that implements a storage volume interface (SVI) data service that provides data redirection. In particular, the storage volume layer 110 insinuates itself between the standard Small Computer Standard Interface (SCSI) block device driver 106 and the underlying drivers and shunts I/O information through the other data service kernel modules 112–116.

The network data replicator kernel module 112 provides data replication services that involve transparent replication of volumes over public or private Internet protocol infrastructure, or locally, via SCSI protocol, over fibre channel connections. Synchronous, asynchronous and semi-synchronous modes of replication are supported. Module 112 provides support for loss of a network link (or a remote node) via a logging mode where I/O writes to a local volume are logged in a separate bitmap volume. When the network link is restored (or the remote node recovers), the remote volume can by resynchronized to the local volume. Module 112 is part of a "StorEdge™ network data replicator system" (SNDR system). "StorEdge™" is a trademark of Sun Microsystems, Inc.

The data imaging module 114 implements a "point-in-time" volume copy data service between a volume pair in a data image volume set. Illustratively, the data imaging system could be an "Instant Image" data imaging system (II data imaging system.) "Instant Image™" is a trademark of Sun Microsystems, Inc. A data image volume set contains a volume pair, including the original logical volume (the master volume) and the point-in-time copy of the original (the shadow volume), and a volume used to store a bitmap that tracks the differences between the master and shadow volumes. Once the data image volume pair is established, the master and shadow volumes can be accessed independently. As discussed below, the data-imaging module allows data updates to be sent from the master volume to the shadow volume as well as updates to be sent from the shadow volume to the master volume when desired.

The data-caching module 116 provides block-based caching operations for disk input/output. These operations provide typical caching functionality, such as read caching, read ahead and small write coalescing for sequential RAID writes. Module 116 also provides write caching when non-volatile RAM boards are installed in the computer system as a "safe" store (called a "Fast Write cache"). In this case, the destaging operations associated with the writes can be performed asynchronously at a time after the writes are acknowledged. Typically, these NVRAM cards are battery-backed so that data is not lost if there is a power failure. In addition, two NVRAM boards may be used arranged as "mirror" devices to store identical copies of the data so that data is not lost should one of the boards fail.

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts so that local volumes must be SVI volumes.

A data caching system constructed in accordance with the principles of the invention comprises three layers or tiers. The first, or upper, tier is a presentation layer with which a manager interacts at a single host location. The upper tier, in turn, interacts with the middle tier comprised of a plurality of federated beans, each of which performs specific tasks in the data caching system. The federated beans can communicate with each other both in the same host and in other hosts via a network connecting the hosts. Some of the beans can communicate with the lowest tier that comprises the aforementioned kernel modules that actually perform the data services. In this manner the data caching system can be configured and managed from a single location.

Figure 2:
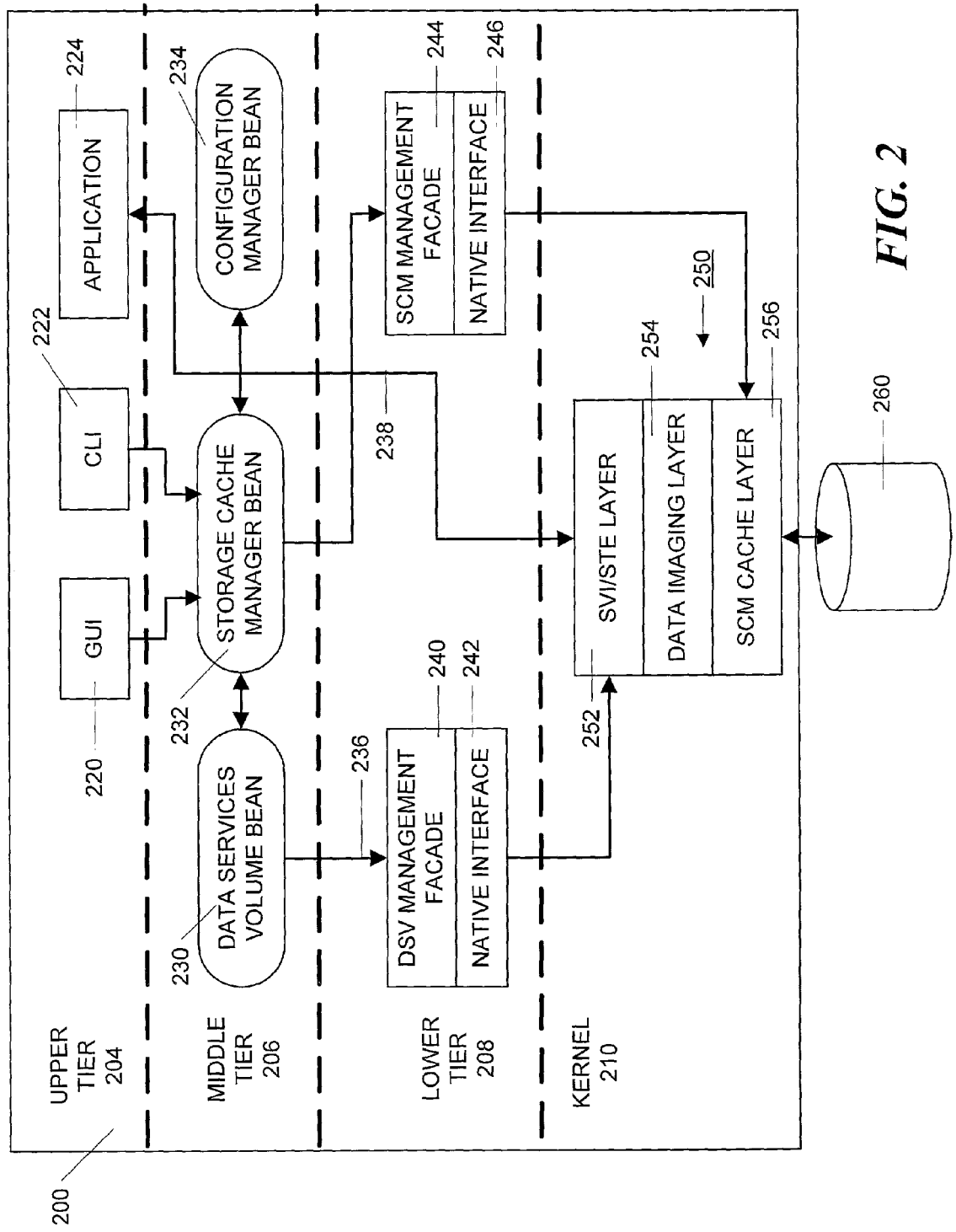
FIG. 2 is a block schematic diagram of a three-tiered system for providing a data caching service in a single host, illustrating an upper presentation tier, a federated bean middle tier and a management facade lower tier.

FIG. 2 shows a host system 200 that illustrates the contents of the three tiers running in the memory of a single host. The inventive data service system comprises three layers or tiers: an upper tier 204, a middle tier 206 and a lower tier 208. The upper tier 204 is a presentation level which can be implemented with either a graphical user interface (GUI) 220 or a command line interface (CLI) 222, both of which are described in detail below. A manager interacts with this level, via the GUI 220 or CLI 222, in order to create, configure and manage a data caching system. The GUI 220 and the CLI 222, communicate with the data caching bean 232 running in the host 200 where the GUI 220 and CLI 222 are running as indicated in FIG. 2.

The middle tier 206 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at Sun website jiro.com, which manual is incorporated by reference in its entirety.

For data caching purposes, two main federated beans are involved. These include the data caching bean 232 and the data services volume (DSV) bean 230. Data caching bean 232 implements the aforementioned data caching system and DSV bean 230 locates, configures and manages volumes used by the data-caching bean. The data caching bean 232 communicates with the DSV bean 230 whenever data caching bean 232 starts or stops using a volume managed by DSV bean 230.

In order to manage a data caching system, data caching bean 232 communicates with a data caching layer 254 in the layered stack 250, via a data caching management facade 244 and a native interface 246. The data caching capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate, a data caching layer 254 and a cache layer 256 and may also include other layers (not shown in FIG. 2). Application programs running in host 200, such as application 224, and the host file system access resource 260 though the layered stack 250 as indicated schematically by arrow 238.

In order to provide for remote management capability in accordance with the principles of the invention, the data caching layer 254 and the SVI/STE layer 252 are controlled by software running on the lower tier 208 of the inventive data services system. The lower tier includes a native interface 246 that converts the APIs exported by the data caching layer 254 into a platform-independent language, such as Java™. The native interface 246 is, in turn, controlled by a data caching management facade 244 that provides the required remote management capability.

The data caching management facade 244 provides a means by which the data caching layer 254 can be accessed and managed as a Jiro™ service. The native interface 246 converts the platform-specific kernel routine API's to platform independent interfaces. The data caching layer 254 allows the data caching bean 232 to manage logical volume sets for use by a data caching system.

Whenever changes are made in the data configuration of host 200, both the DSV bean 230 and the data caching bean 232 can inform a configuration manager bean 234 of the change in configuration information. Data caching bean 232 also retrieves configuration information from the configuration manager bean 234 under appropriate situations. The configuration manager bean 234 maintains a persistent view of the configuration of the data services system on host 200. In this manner, if the host is interrupted during an operation, it can be restored to the proper state when the operation is resumed.

DSV Bean 230 is responsible for discovering volumes available on the local system 200, configuring those volumes when necessary, via an SVI/STE management facade 240, and coordinating the use of those volumes between other data service federated beans. DSV bean 230 is a Federated Bean as described in the aforementioned Federated Management Architecture (FMA) specification. When created, it registers itself with a local Jiro™ station, and provides its services to any other federated beans within the same Jiro™ management domain. In particular, the data-caching bean 232 can contact the DSV bean 230 in order to obtain lists of volumes available for data caching purposes.

Along with providing the ability to control the SVI and STE data services, DSV Bean 230 also gives clients the ability to discover what other applications are currently using a particular volume. Assuming these other applications have implemented the required interfaces, clients can also retrieve more detailed information about volume usage. For example, a client can discover if one of the data services is currently blocking write access to a specified volume. Thus, the DSV bean 230 provides tools that applications can use to correctly diagnose errors produced when multiple data services attempt to access volumes in an inconsistent manner.

The DSV management facade 240 provides a means by which the SVI/STE layer 252 can be accessed and managed as a Jiro™ service, i.e., a service that can be managed in a distributed environment from a remote host. The DSV management facade 240 is essentially an object-oriented model of the kernel-resident SVI/STE layer 252. It provides a collection of APIs to manage the SVI/STE layer 252. The DSV federated bean 230 uses the DSV management facade 240 to configure, control and examine the status of the SVI/STE layer 252 and to provide other important functions.

Figure 3:
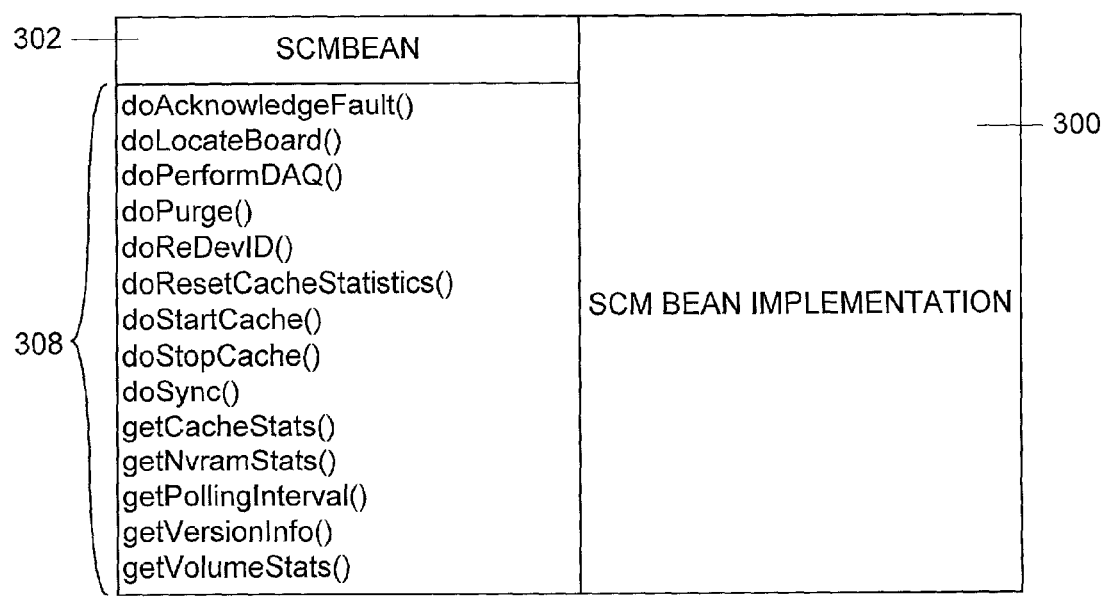
FIG. 3 is a schematic block diagram illustrating the architecture of a data caching bean and the interfaces exported by the bean.

The interfaces exported by the data-caching bean 232 are shown in FIG. 3. The Storage Cache Manager federated bean (SCMBean) comprises an implementation 300 that is created by a constructor for a particular Jiro™ domain. When created, the SCMBean attempts to connect to an ScmAdminMF interface in the SCM management facade (discussed below). Using this latter interface, the SCMBean can make calls on methods in the SCM management facade. The SCM management facade methods, in turn, call (via the native interface) routines in the appropriate kernel layer that set up and monitor data structures that gather the required statistics and configure data structures to perform the requested services.

The SCMBean implementation 300 has an SCMBean interface 302 that includes a number of methods 308. In order to simplify the diagram, some conventional "get" and "set" methods have been omitted from methods 308. These latter "get" and "set" methods manage such information as polling interval, version information, memory size power state and read and write policies.

Methods 308 include a doAcknowledgeFault( ) method that acknowledges a flashing yellow light on an NVRAM hardware board that indicates a fault has occurred and changes the light to a steady yellow light. A doLocateBoard( ) method accepts, as a parameter, an NVRAM board instance ID and flashes all lights on the specified NVRAM board to easily identify it. A doPerformDAQ( ) method instructs the SCM management facade to perform a data acquisition to refresh statistics displayed by other methods discussed below.

A doPurge( ) method discards any outstanding volume data that is "pinned" in the NVRAM memory. Pinned data is data that is in the cache and that cannot be destaged to a disk for any reason, such as the disk has failed, the volume is offline, etc. A doReDevID( ) method accepts a disk name and performs a re-ID of the specified disk by obtaining information from a new or replaced disk.

A doResetCacheStatistics( ) method resets the statistical counts associated with the cache. A doStartCache( ) method starts a caching operation for those volumes which are online and designated to be cached. Similarly, a doStopCache( ) method stops the caching operation. A doSync( ) method accepts a volume name and puts the specified volume back online by re-issuing any outstanding failed write operations out to the volume.

The getCacheStats( ) method gets statistics regarding the cache memory. These statistics include the service status, operational status, cache memory size, block size, read policy, write policy, flusher thread count (flusher threads perform the destaging operations) total memory used by cache, read hits, read misses write hits, write misses and the number of write blocks. When called, the getCacheStats( ) method creates an object that encapsulates all of the statistics and that is returned to the caller. The object contains "get" methods that the caller can use to access the statistics in the object. The use of a separate object reduces the number of "get" methods provided in the SCMBean interface.

The getNvramStats( ) method gets statistics regarding the NVRAM memory. These statistics include driver versions, battery status, board size, errors, whether a "dirty bit" (indicating the cache contains data that must be destaged) has been set, a card instance ID, the bus instance ID, an ID of a mirror device, the device ID and the operational status. As with the getCacheStats( ) method, the getNvramStats( ) method returns an object that encapsulates all of the statistics. This object also contains "get" methods that the caller can use to access the statistics in the object.

The getPollingInterval( ) method gets the current polling interval or the time interval at which the SCM management facade will refresh the internal data and check the state of the cache service. The getVersionInfo( ) method gets version information for various pieces of the SCM management facade and kernel software and returns an object encapsulating the information.

The getVolumeStats( ) method gets volume statistics, including the operational status, the volume name, the read policy, the write policy, the number of disk I/O reads, the number of disk I/O writes, the number of cache reads, the number of cache writes, the number of dirty blocks that need to be destaged to disk, the number of blocks that have already been written to disk and the number of write blocks that failed to be written to disk. This method also returns an object encapsulating the data.

Figure 4:
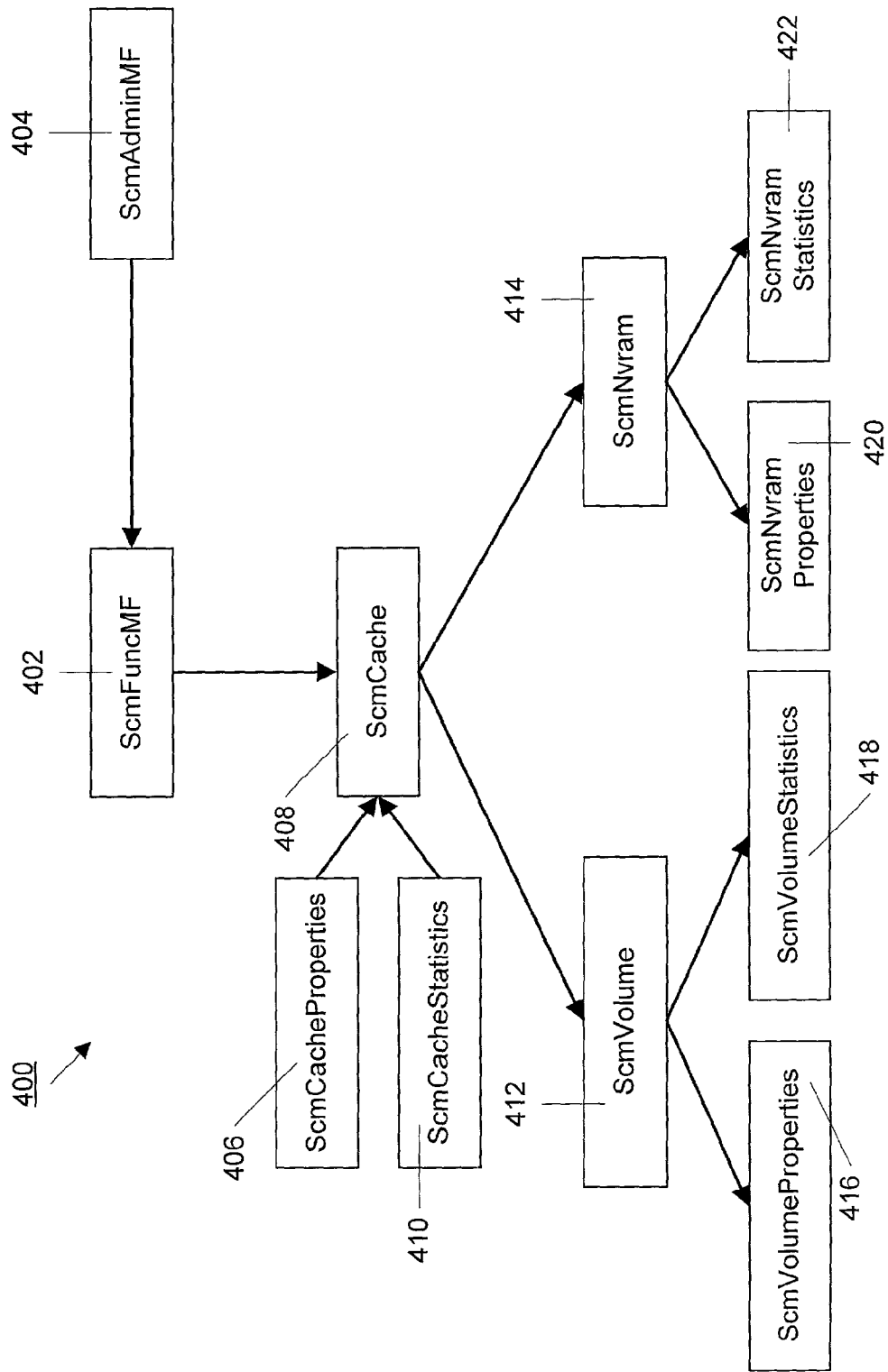
FIG. 4 is a schematic diagram of the interfaces exported by a data caching management facade.

As previously mentioned, the data caching bean controls the data caching kernel layers that actually perform the data caching by means of a Jiro™-based management facade. FIG. 4 illustrates the data caching (SCM) management facade interfaces 400 that are used by the SCMBean. The data-caching bean can lookup the caching administrative interface, ScmAdminMF 404, through the Jiro™ lookup service. The caching functional interface, ScmFuncMF 402, can also be discovered through the Jiro™ lookup service as well as can be retrieved from the ScmAdminMF interface 404 using a getSCMFuncMF( ) method. Once the ScmFuncMF interface 402 has been retrieved, an ScmCache interface 408 can be retrieved from ScmFuncMF 402 and it has an ScmNvram interface 414 and an ScmVolume interface 412 along with an ScmCacheProperties and ScmCacheStatistics interfaces, 406 and 410, respectively. In turn, the ScmNvram interface 414 has an ScmNvramProperties interface 420 and an ScmNvramStatistics interface 422. The ScmVolume interface 412 has an ScmVolumeProperties interface 416 and an ScmVolumeStatistics interface 418. These interfaces contain methods that can be used to control the appropriate devices and gather information.

Appropriate event messages are fired when important events occur. These events include ScmNvramPropertyChangedEvent and ScmPropertyChangedAlarmEvent messages, which are generated by changes to the NVRAM board properties. ScmNvramAddedEvent and ScmNvramRemovedEvent messages are generated when NVRAM boards are added or removed, respectively. SCM volume property changes, additions or deletions generate ScmVolumePropertyChangedEvent, ScmVolumeAddedEvent, and ScmVolumeRemovedEvent messages, respectively.

Figure 5:
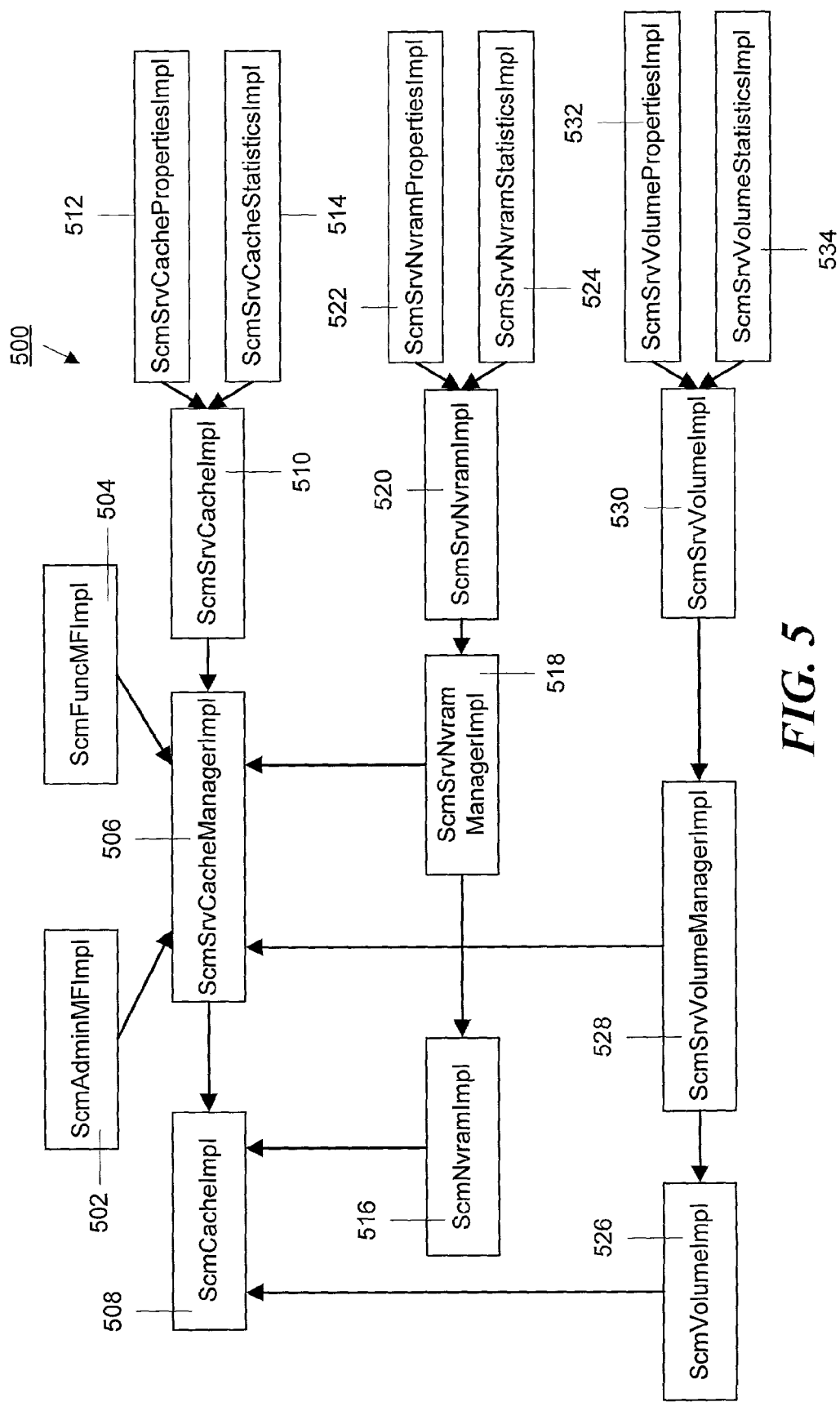
FIG. 5 is a schematic diagram of the implementation objects for the data caching management facade shown in FIG. 4.

FIG. 5 illustrates the implementation details of the data caching management facade. In this implementation, several manager objects carry out the underlying operations needed to manage the data caching service. The ScmSrvCacheManagerImpl 506 is the overall coordinator and is controlled by the ScmAdminMFImpl 502 and the ScmFuncMFImpl 504. During an initial creation sequence, an ScmFactory creates the ScmAdminMFImpl object 502. The ScmAdminMFImpl 502 then creates the ScmFuncMFImpl object 504 and the ScmSrvCacheManagerImpl object 506. In turn, the ScmSrvCacheManagerImpl object 506 creates the ScmSrv- VolumeManagerImpl 528 and the ScmSrvNvramManagerImpl 518. The ScmSrvCacheImpl 510 is created by the ScmSrvCacheManagerImpl 506 and, in turn, creates the ScmCacheImpl object 508, the ScmSrvCachePropertiesImpl object 512 and the ScmSrvCacheStatisticsImpl object 514. The ScmSrvNvramImpl object 520 is created by the ScmSrvNvramManagerImpl 518 object and, in turn, creates the ScmNvramImpl 516, the ScmSrvNvramPropertiesImpl object 522 and the ScmSrvNvramStatisticsImpl object 524. Finally, the ScmSrvVolumeImpl object 530 is created by the ScmSrvVolumeManagerImpl 528 object and, in turn, creates the ScmVolumeImpl 526, the ScmSrvVolumePropertiesImpl object 532 and the ScmSrvVolumeStatisticsImpl object 534

The ScmSrvCacheManagerImpl 506 delegates the cache management to the ScmCacheImpl object 508, the ScmSrvNvramManagerImpl 518 delegates the NVRAM management to the ScmNvramImpl object 516 and the ScmSrvVolumeManagerImpl 528 delegates volume management to the ScmVolumeImpl object 526.

Figure 6:
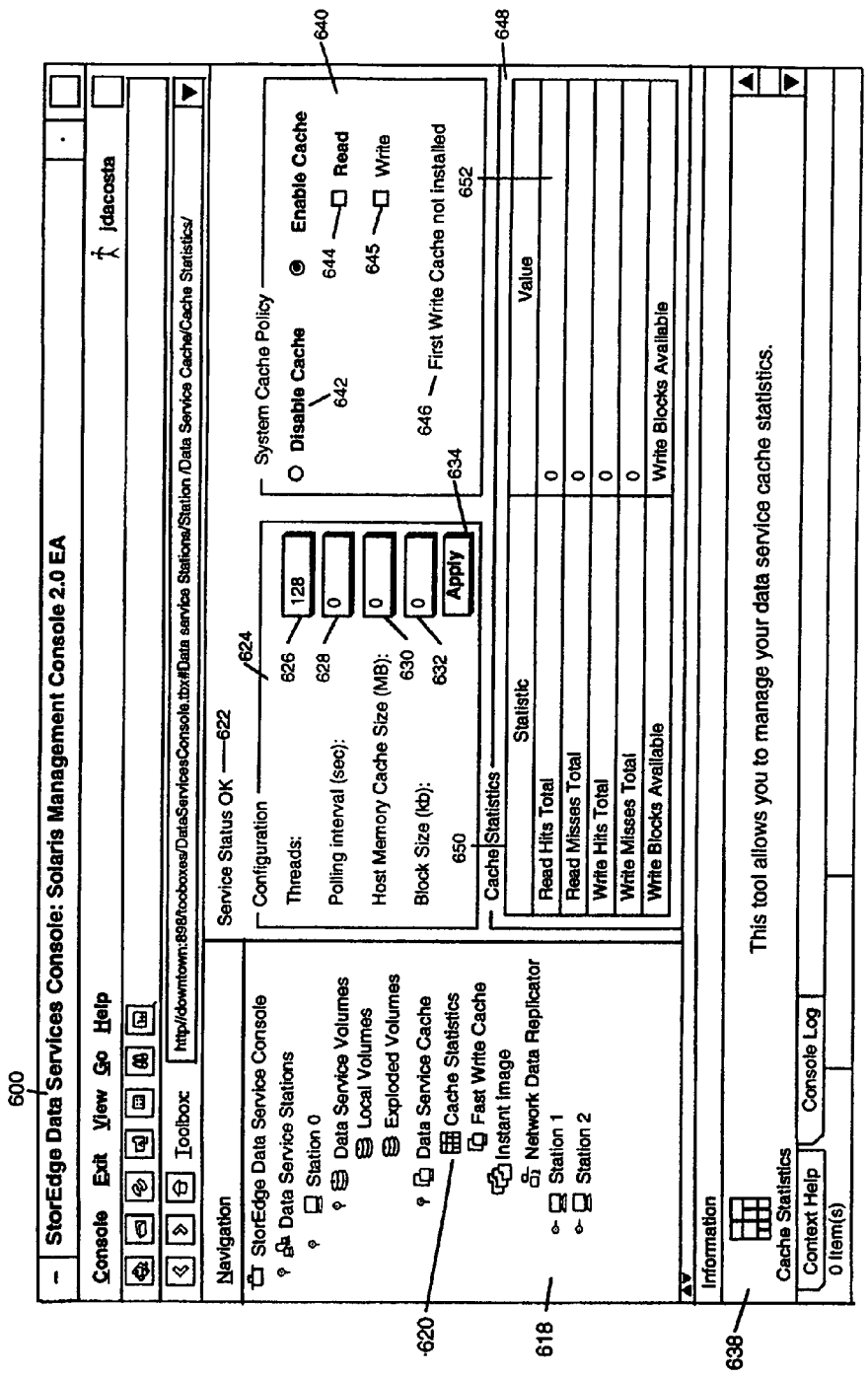
FIG. 6 is a screen shot of a screen display generated by a graphic user interface that controls a data caching bean allowing configuration information to be entered and showing the display of cache memory statistics.

A screen shot showing the screen display generated by the GUI 220 (FIG. 2) for viewing and controlling data caching is illustrated in FIG. 6. The GUI 220 interacts with the SCMBean by calling the appropriate methods to obtain the information displayed and to set selected attributes. FIG. 6 displays a screen 600 that displays information concerning cache information and cache statistics that would be generated by the graphic user interface after selection of the "Cache Statistics" display 620 in the navigation pane 618. Information regarding the selection is shown in the information panel 638. The cache information includes the service status, configuration and system cache policy.

The cache service status is displayed in the service status area 622. The configuration is displayed, and can be modified, in area 624. The number of flusher threads can be entered into text box 626 and the polling interval can be entered into text box 628. Similarly, the host memory size can be entered into text box 630 and the cache block size can be entered into text box 632. The values entered into boxes 626–632 are applied to the cache memory when the "Apply" pushbutton 634 is selected.

The system cache policy can be set in area 640. In particular, the cache memory can be enabled or disabled by means of radio buttons 642. This control allows a system administrator to dynamically control the cache memory by selectively enabling the cache for selected volumes and then disabling the cache when it is no longer needed. The cache memory can be set to perform read operations by checking checkbox 644 and, if NVRAM boards are installed, can be set to perform write caching by checking checkbox 645. The status of the NVRAM boards is displayed in line 646 that indicates that the Fast Write Cache (NVRAM boards) is not installed. Consequently, the checkbox 645 is disabled.

Screen 600 also illustrates information that is displayed after cache memories have been configured and enabled. The screen 600 contains a table 648 that displays the cache statistics. Column 650 displays the name of the statistic. Column 652 displays the statistic value.

A screen shot showing the screen display generated by the GUI 220 (FIG. 2) for viewing and controlling the NVRAM boards is illustrated in FIG. 7. The GUI 220 interacts with the SCMBean to generate this display by calling the appropriate methods to obtain the information displayed and to set selected attributes. FIG. 7 displays a screen 700 that displays information concerning NVRAM boards information that would be generated by the graphic user interface after selection of the "Fast Write Cache" display 720 in the navigation pane 718. Information regarding the selection is shown in the information panel 738.

Screen 700 is used solely for monitoring and refreshing the state of installed NVRAM boards. Typically, only one pair of boards can be installed at a time. Each panel 760, 762 displays the status of one NVRAM board and the boards mirror each other. The status of the NVRAM cards is indicated in the status line display 772. Each panel includes a column 764, 768, respectively, that lists the property names. A second column 766, 770 lists the corresponding property values.

There is only one possible user action: refresh information. This option is displayed in the console's menu bar 702 and can also be initiated by selection toolbar button 706. Activating the refresh option simply refreshes the NVRAM data displayed in columns 766 and 770.

When invoked, the GUI performs a lookup in the Jiro™ service to find a proxy handle to the SCM federated bean. This proxy is used to make a call to the methods discussed above in the SCM bean. These methods, in turn, relay information to the management facade and, via the native interface, to the corresponding kernel layer. Thus, information can retrieved or sent to the kernel layer using the proxy.

Alternatively, the data caching federated bean can be controlled by a command line interface. The basic command is scmadm. Various parameters and variables are used with this command to generate the appropriate information that can be used by the SCMBean to perform the desired operation. The various operations that can be specified with the command line interface include the following.

| | | |
|---|---|---|
| scmadm | | prints a list of configured cache descriptors with disk names, options, and global options. |
| scmadm -h | | prints usage information for the scmadm command. |
| scmadm -e | | reads the configuration and enables the storage device cache with those parameters. |
| scmadm -d | | shuts down the storage device cache. |
| scmadm {-L | \|-A bitmapfs \| -D bitmapfs } | |
| | | StorEdge DataServices bitmap filesystem operations. These commands are not available when running within a cluster. The commands available are: |
| | -L | List the names of configured bitmap file systems, one per line. The names will be as supplied to a previous "scmadm -A bitmapfs" command. |
| | -A bitmapfs | Add a new bitmap filesystem name, bitmapfs, into the configuration. Bitmapfs should be either the name of a block device that contains the filesystem to mount, or the name of the filesystem mount point. |
| | -D bitmapfs | Delete a bitmap filesystem name, bitmapfs, from the |

|  |  |
|---|---|
| | configuration. |
| scmadm -C | [parameter[=[value]] . . . ] |
| | sets or displays the configuration parameters. If -C is specified with no other arguments, the current cache configuration parameters are displayed. |
| | If parameter is specified, the current value of parameter is displayed. |
| | If parameter=value is specified, the current value of parameter is displayed and the parameter is changed to value. If value is omitted, or if value is specified as the null string, "", or as "-", the parameter is deleted from the configuration and the system will use the default value. Multiple parameters may be specified in a single invocation of the scmadm command. A change in a configuration parameter will only take effect when the cache is next restarted. |
| scmadm -o { | system | cd | diskname } [option] |
| | sets or displays the options for the system or for the cache device specified by cd or diskname. If the option rdcache, nordcache, wrthru, or nowrthru is specified, the system or specified cache device is set to that option. The option is saved as part of the configuration so that the option persists. To tell the system to forget about a saved option use the forget option (but note that this does not change the option, it just removes it from the saved configuration). If no option is specified, current options are displayed. On systems with NVRAM or cache hardware, the rdcache option is set as the default. On systems without NVRAM or cache hardware, the rdcache and wrthru options are set as the default. |
| | The options are defined as follows: |
| | rdcache         Data blocks are likely to be referenced again and should remain in cache. |
| | nordcache      Data blocks are unlikely to be referenced again and should be treated as least recently used, so that other blocks can remain in cache longer. |
| | wrthru Indicates that writes go to disk synchronously. |
| | nowrthru        Indicates that writes go to disk asynchronously. |
| scmadm -m | {diskname | all } |
| | prints the cache descriptor and diskname map for the device specified by diskname or prints the cache descriptors and diskname map for all storage devices on the system if all is specified. |
| scmadm -p { | diskname | all } |
| | purge; discards the bad blocks for the device specified by diskname or for all storage devices on the system if all is specified. |
| scmadm -r { | diskname | all } |
| | redevid; re-identifies the new or replaced disk specified by diskname or re-identifies all storage devices on the system if all is specified. |
| scmadm -s { | diskname | all } |
| | sync; restores data on the device specified by diskname or for all storage devices on the system if all is specified. |
| scmadm -S [-M] [-d delay_time] [-I logfile] [-r[range]] [-z] | |
| | collects and displays statistics on the data cache and any installed data replication system. |
| | scmadm -S has a set of options for use when invoking the command as well as a set of display commands for use while the command is running. |
| | - M Displays statistics related to the data replication system. The data replication software must be installed on the system for this option to be used. If scmadm -S is invoked without the -M option, the command displays statistics related to the storage device cache. |
| | - d delay_time Sets the display update time to delay_time seconds. |
| | - I logfile Writes all screen outputs to the specified logfile. |
| | - r [range] Specifies one device or a combination of a single device, an inclusive range of devices, and multiple devices. If no range is specified, all devices are displayed. The range must be specified in the following format: n[:n][,n] . . . Where n is the number(s) of the specified decimal device(s). Where a colon (:) is a separator specifying an inclusive range of devices. Where a comma (,) is a separator specifying another device. The following two examples specify the same devices (3, 6, 7, 8, 9, 10, 11, 12, 14, and 15): |
| | -r 3,6:7,8,9:12,14:15 |
| | -r3,6:12,14,15 |
| | [- z] Clears the statistics first. |
| DISPLAY COMMANDS | |
| When scmadm -S is running, the display can be changed by selecting various keys. | |
| | + increases the screen update delay an additional second. |
| | − decreases the screen update delay by a second (minimum delay is 1second.) |
| | C clears the screen and redisplays statistics. |
| | M/m toggles between regular and a data replication screen display if the data replication system is installed. |
| | T/t toggle between screens. In default mode, T/t toggles between regular (per second statistics) and cumulative screens. If SNDR statistics are being displayed, T/t toggles back to the cumulative screen. |
| | B toggles between normal and bold types. |

-continued

R toggles between normal and reverse video.
z clears the index cache statistics.
f/Cntl-f scrolls display forward to the next set of devices currently not in view.
b/Cntl-b scrolls display backward to the previous set of devices currently not in view.

When using these commands, the command and accompanying parameters are first separated by a conventional parser. The CLI is written as a script that invokes a Java application with the parameters. The Java application, in turn, looks up a proxy to the SCM bean and uses that to control the data caching bean to set up the data caching system. A new proxy is created, used and destroyed each time a command is entered.

Writing to memory is much faster than writing to disk, but eventually the data written to cache must be written to the underlying storage device (disk.) However, since a write is acknowledged as complete when the data is safely stored on mirrored NVRAM boards and before the data is written to disk, the response time of the write operation is greatly reduced. An additional benefit is that the inventive caching system takes small sequential writes and coalesces them into larger writes. The cache also speeds up random writes, but the data must be eventually be destaged to disk, so that disk performance becomes the limiting factor. The cache has little chance to coalesce random writes and instead acts more like a speed-matching buffer. Thus, it can effectively increase throughput for applications that perform burst-type writes, but sustained random throughput is ultimately limited by the underlying disk speed.

Figure 8:
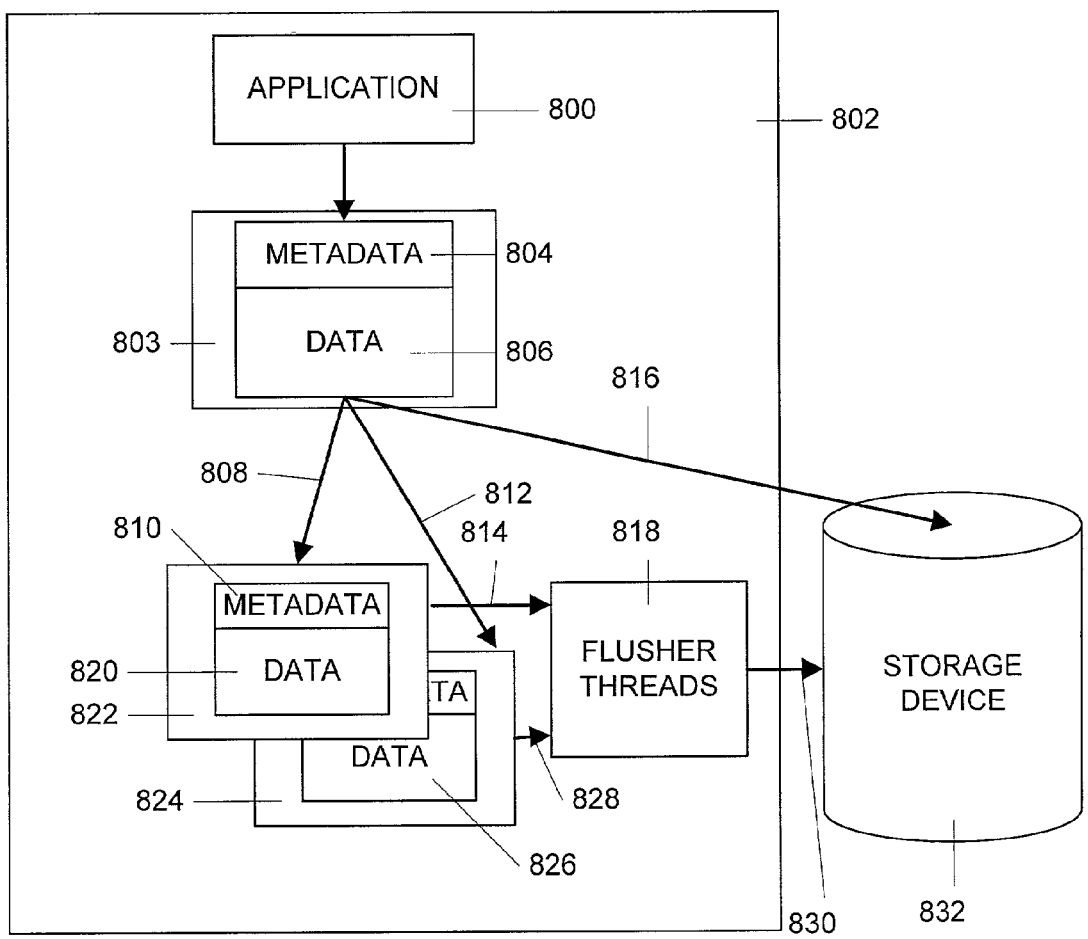
FIG. 8 is a block schematic diagram of a computer system with a read and write cache and illustrating read and write caching operations.
Figure 9:
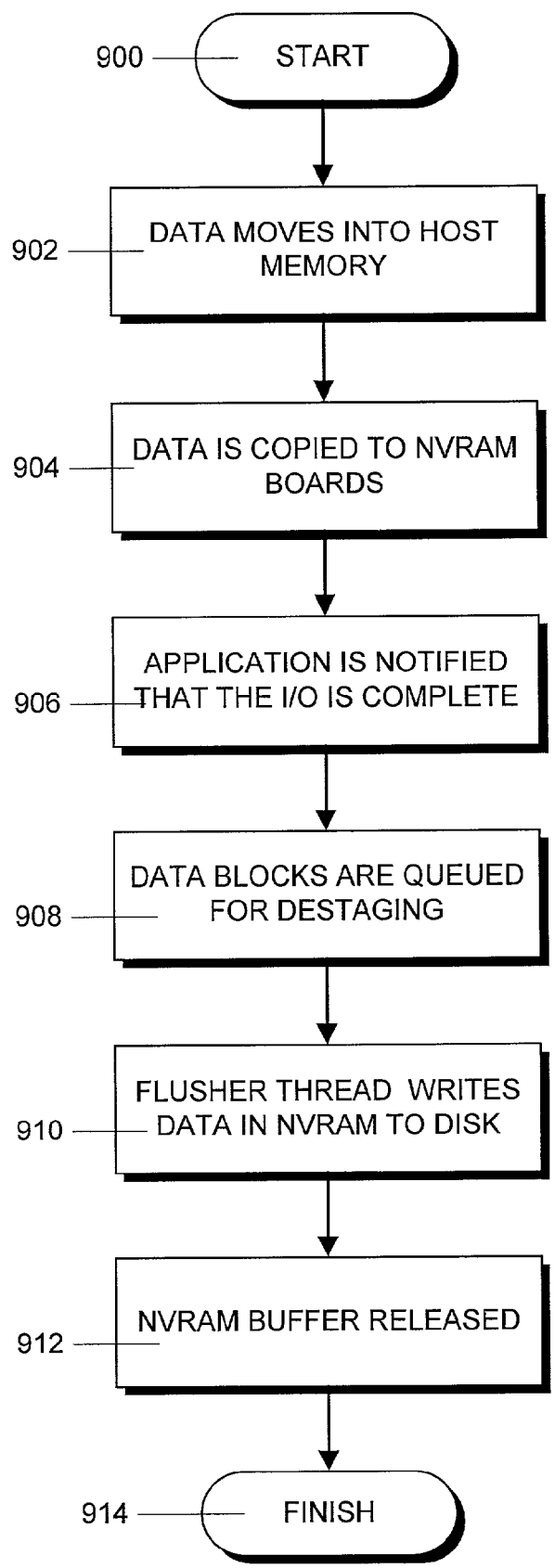
FIG. 9 is a flowchart showing the steps in an illustrative process for writing data to the cache in the computer system shown in FIG. 8.

A typical write operation in a system such as that shown in FIG. 8 is illustrated by the flowchart in FIG. 9. In FIG. 8, an application 800 running in a host system 802 performs writes operations to the storage device 832. The write process begins in step 900 and proceeds to step 902 where the data is moved into the host local memory 803 by the operating system. This data can include metadata 804 and general data 806.

Next, in step 904, the data is copied from the host memory 803 to the mirrored NVRAM cards 822 and 824 as schematically indicated by arrows 808 and 812 (both the metadata and general data are copied as indicated by metadata 810 and 827 and data 820 and 826). In step 906, the application is notified that the I/O is complete.

In step 908, data blocks in the NVRAM devices 822 and 824 are queued for destaging to the storage device 832. Sometime later, in step 910, a flusher thread 818 calls a routine in the NVRAM devices and disk data 820 and 826 is written to the storage device 832 as schematically indicated by arrows 814, 828 and 830. The flusher threads 818 threads wake up at a first time interval if there is much destaging to be done. Otherwise, they wake up only at a second much longer time interval. In one embodiment, destaging is scheduled on a per volume basis, so that when a volume is removed from the cache, all data is first destaged. Additionally, all pending write data is destaged when the cache is shutdown cleanly. The number of flusher threads is tunable using one of the aforementioned routines in the SCMBean.

Once the write is complete, the NVRAM buffer is released in step 912 and the process finishes in step 914. The data remains available in the cache.

During a read operation, if requested data is in host memory 803, it is returned immediately. If it is not in host memory 803, a request is made to the underlying device driver to read the data from the storage device 832. Data may remain in host memory 803 because the data block was recently written and that block has not yet been reused or the data block was recently read and is now being reread.

Figure 10A:
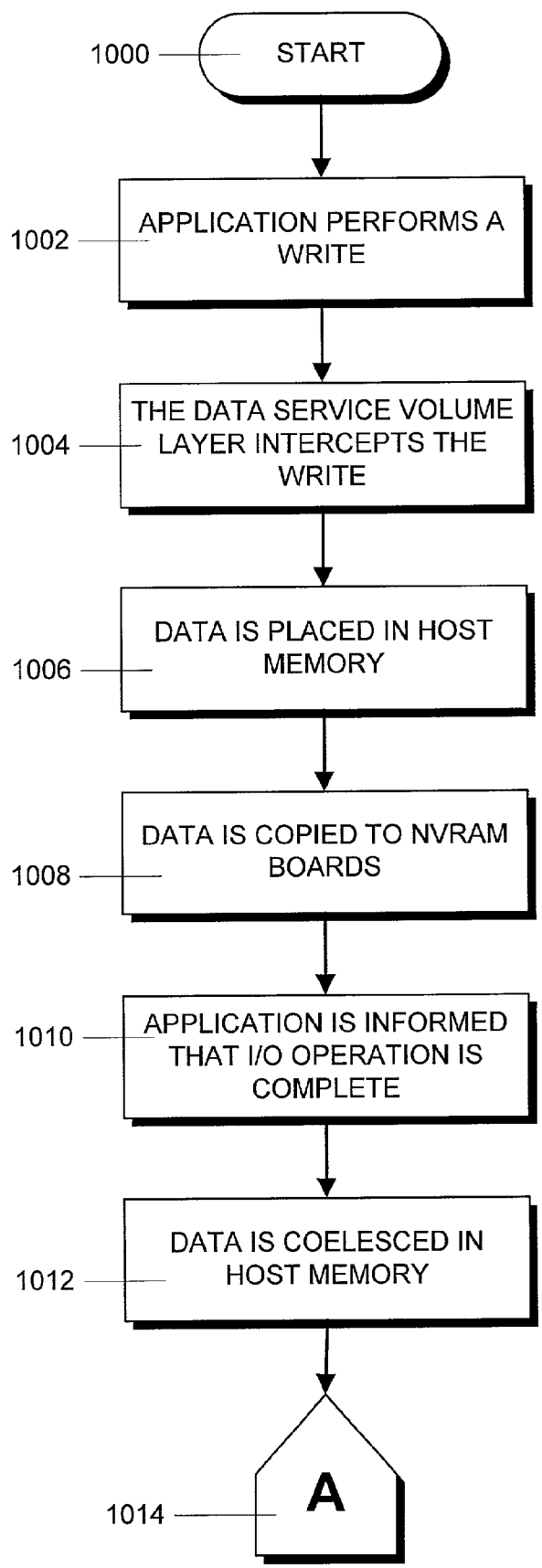
FIGS. 10A and 10B, when placed together, form a flowchart illustrating the steps in an illustrative process for writing data to the cache, which process involves coalescing small data writes.
Figure 10B:
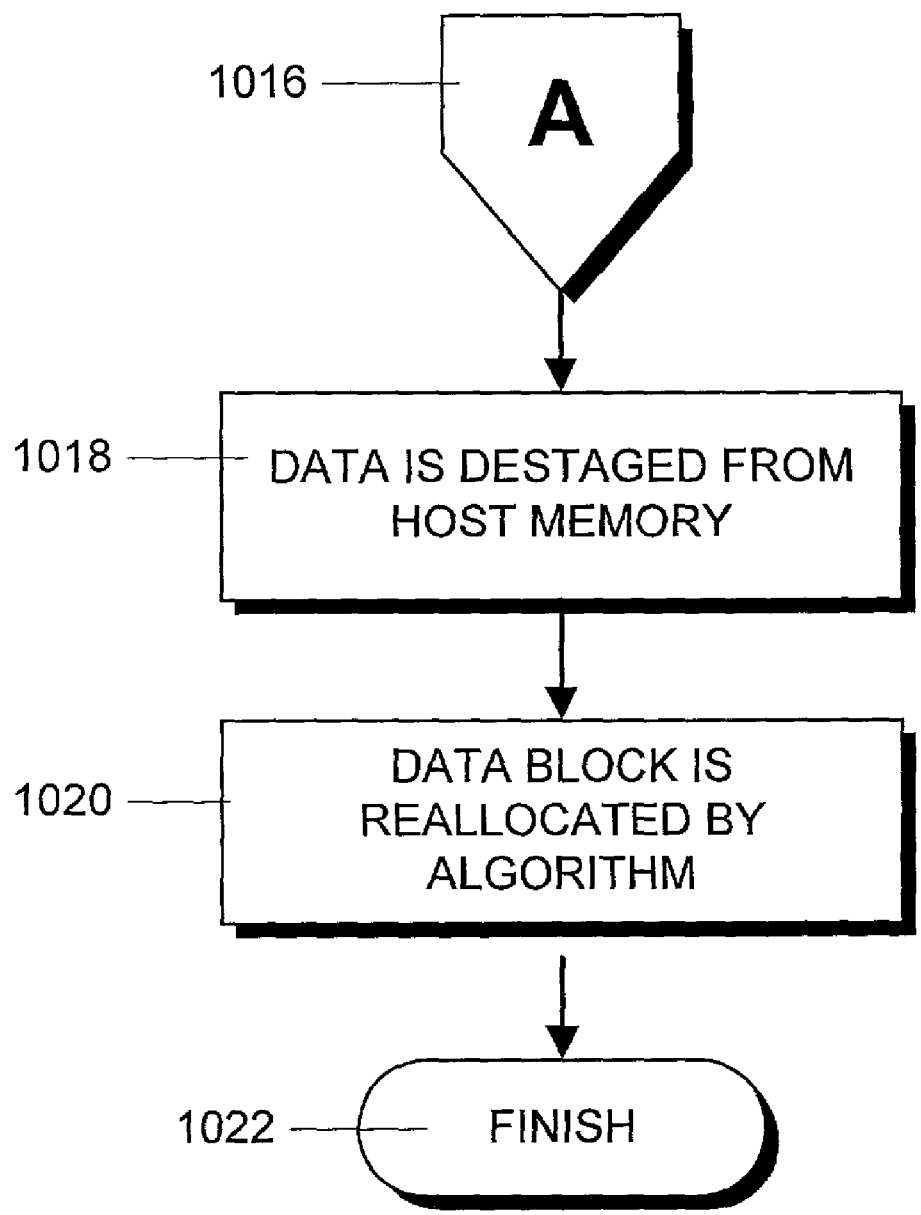

FIGS. 10A and 10B illustrate the sequence of events that occur during a write process that coalesces a plurality of small writes. The process begins in step 1000 and proceeds to step 1002 where application 800 performs a write. In step 1004, a data service volume layer (the storage volume layer 110 of the SCSI target emulation layer 124, FIG. 1) intercepts the write and, in step 1006, the data service layer puts the data into the host local memory 803.

Next, in step 1008, data is copied onto both NVRAM boards 822 and 824 as indicated by arrows 808 and 812. The application is told that the I/O operation is complete in step 1010. Later, in step 1012, the data is coalesced in local memory 803. The process then proceeds, via off-page connectors 1014 and 1016 to step 1018 where the data is destaged from local memory 803 as indicated schematically by arrow 816 and the associated data blocks on the NVRAM boards 822 and 824 marked as free.

The data block remains available in local memory 803 and is eventually reallocated by an algorithm, such as the Least Recently Used (LRU) algorithm, as set forth in step 1020. However, until a block is reused, a read of that block will be a cache hit.

Figure 11:
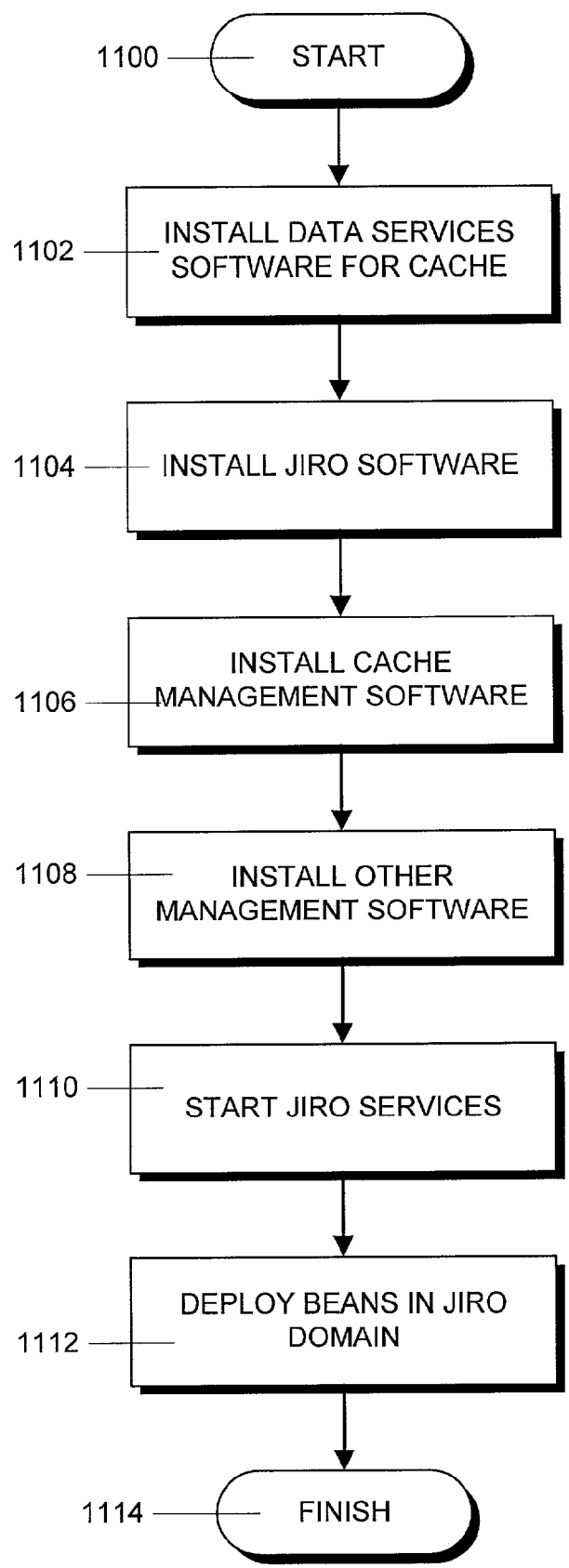
FIG. 11 is a flowchart showing the steps of an illustrative process for installing cache control software in the system of FIG. 2.
Figure 12A:
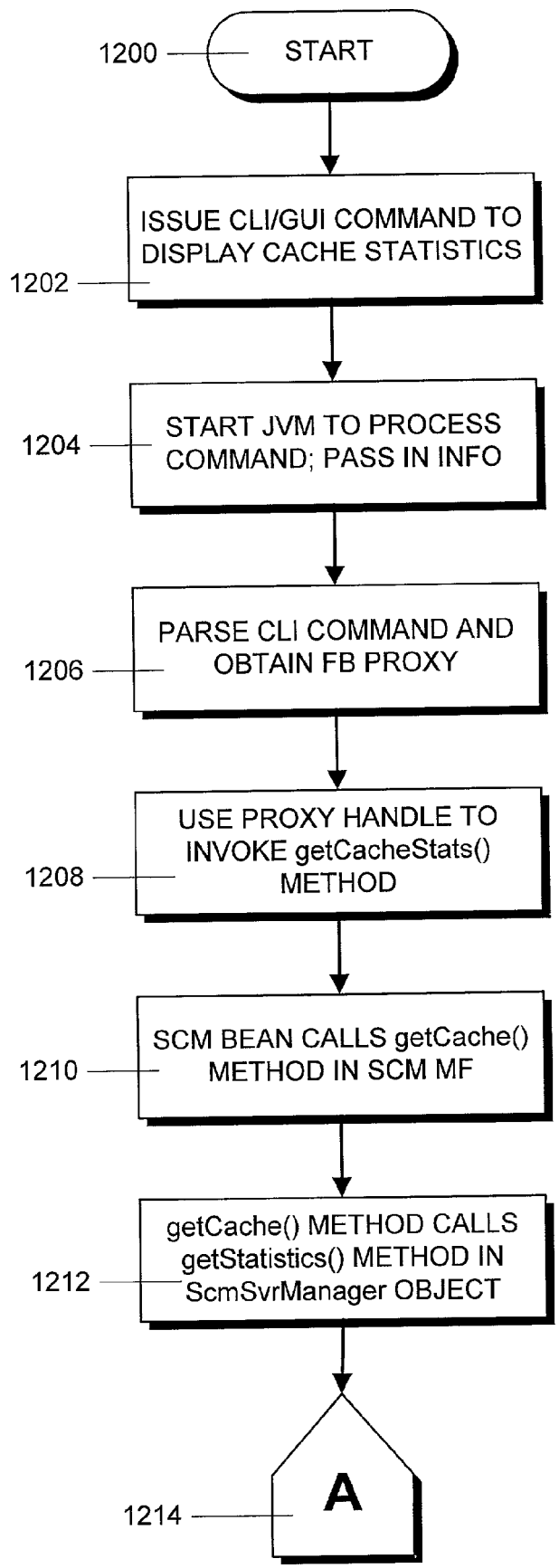
FIGS. 12A and 12B, when placed together, form a flowchart showing the steps of an illustrative process for obtaining cache statistics in the cache management system of FIG. 2.
Figure 12B:
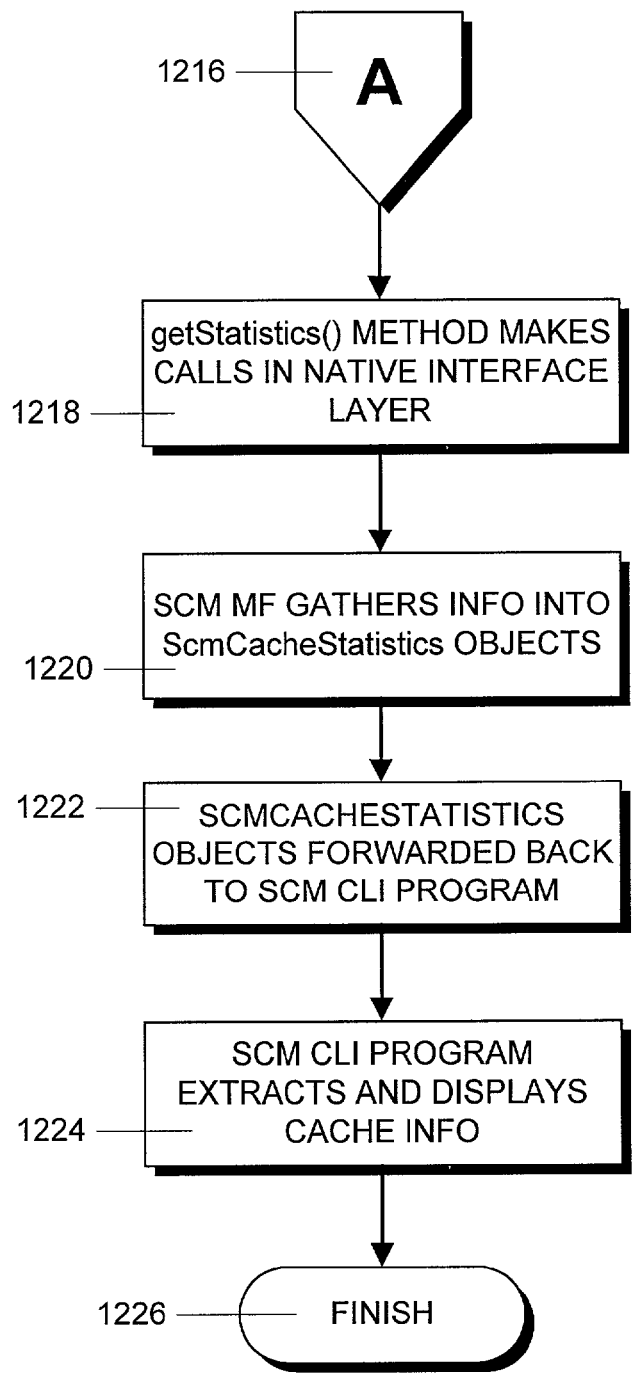

FIG. 11 illustrates the steps performed in initially configuring a cache management system. FIGS. 12A and 12B show a flowchart illustrating the steps carried out by the inventive cache management system to perform an exemplary operation of obtaining cache statistics.

In order to use the inventive system, the software that is required must first be installed in the system. The steps of the installation process are shown in FIG. 11. The installation process begins in step 1100 and proceeds to step 1102 where the data services software used for the cache management system is installed on a host computer system, such as computer system 200 (FIG. 2.) This software includes the data service volume software 252 and the SCM cache layer software 256. Other layers, such as the data-imaging layer 254 can also be included in this installation process.

Next in step 1104, the Jiro™ software is installed. The installation process for this software is explained in detail in the aforementioned Jiro SDK.

In step 1106, the SCM management software is installed. This software includes the SCM management facade 244 and the native interface 246. It also includes the storage cache manager federated bean 232 and the command line interface 222 or the graphic user interface 220, as appropriate.

In step 1108, other necessary management services software is installed. This software includes other management facades, such as the data services management facade 240 and its accompanying native interface 242 and federated beans such as the configuration manager bean 234 and the data services bean 230.

Then, in step 1110, the Jiro services software is started with a Jiro domain name, such as jiro:Host a. In step 1112, the SCM and other federated beans are deployed in the Jiro domain. During this step, necessary management facades get automatically instantiated. The process then finishes in step 1114.

After the installation and deployment steps are complete, the process of obtaining cache statistics can begin. The steps involved in this process are illustrated in FIGS. 12A and 12B. During this process, the system manager executes a CLI command, or equivalently, uses the SCM GUI to generate the command.

The process begins in step 1200 and proceeds to step 1202 where, from 20 the command prompt generated by the CLI 222 on host 200, the system manager issues the following command, or a similar command:

scmadm-S

Alternatively, the command can be generated from information entered into the GUI 220 described above. In the discussion below, use of the CLI program 222 is assumed. Those skilled in the art would know that the GUI disclosed above could also be used in an equivalent fashion. As set forth in step 1204, entry of the command, starts a Java Virtual Machine (JVM) for the SCM CLI program and passes in necessary information, such as an identification of the host in which the CLI was issued (Host a), a port number for the Jiro™ service (typically 4160), the Jiro domain name in which the federated beans, including bean 232, and management facades, including management facade 244, are deployed (in this case jiro:Host_a) as well as the SCM options used in scmadm command.

Next, in step 1206, the SCM CLI program 222 parses the command line options used while invoking the scmadm module. After parsing the options, the CLI program 222 determines that the scmadm module was invoked to display cache statistics. Since this operation will need to use the SCM federated bean 232, the CLI program 222 uses a lookup service that is part of the Jiro program to get a proxy handle of the SCM federated bean 232 that is managing the SCM data services 256 on host A 200 in the domain jiro:Host_a.

Once the SCM CLI program 222 locates the appropriate SCM federated bean 232 and retrieves the proxy handle to the bean 232, in step 1208, the CLI program 222 invokes the getCacheStats( ) methods on the SCM Bean 232.

Next, in step 1210, a call to the getCacheStats( ) method in SCM federated bean 232, triggers a call inside the SCM federated bean 232 that, in turn, calls the getCache( ) method on the SCM management facade 244.

In step 1212, when the getCache( ) method is called on SCM management facade 244, it, in turn, calls a getStatistics( ) method inside the ScmSvrCacheManager object (derived from class ScmSvrCacheManagerImpl 506, FIG. 5). The process then proceeds, via off-page connectors 1214 and 1216, to step 1218. The, in step 1218 the getStatistics( ) method makes appropriate calls in the native interface 246 to gather all the cache statistics from the kernel data services layer 256.

In step 1220, the SCM management facade 244 packages all the gathered information inside an ScmCacheStatistics object and returns the object to the SCM federated bean 232 in step 1222, which, in turn, returns the object back to the SCM CLI program 222. Finally, in step 1224, the SCM CLI program 222 extracts the cache statistics from the Scm-CacheStatistics object and displays the information to the user. The process then finishes in step 1226.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing a data caching service from a management terminal in a distributed computer system having a host computer system with a host memory and at least one storage device connected to the computer system by driver software, the method comprising:

(a) inserting an interface layer between the driver software and the storage device, the interface layer exporting a platform dependent API comprising a plurality of API methods that can be called to control data passing between the driver software and the storage device;

(b) running, in the host computer system, management facade software that receives calls to platform-independent methods and generates at least one API method call to the interface layer in order to execute the platform-independent method calls;

(c) running, in the host computer system, a federated bean that generates platform-independent method calls to the management facade software to control the interface layer via the plurality of API methods; and (d) controlling the federated bean to enable a data read cache by instructing the interface layer to intercept requests for data from the storage device and, if the data is in the host memory, to retrieve the data from the host memory, and to retrieve the data from the storage device if the data is not in the host memory.

2. The method of claim 1 wherein step (d) comprises controlling the federated bean with a command line interface.

3. The method of claim 1 wherein step (d) comprises controlling the federated bean with a graphical user interface.

4. The method of claim 1 further comprising:
(e) using the federated bean to disable the read cache.

5. The method of claim 1 further comprising:
(f) using the federated bean to set characteristics of the read cache.

6. The method of claim 1 wherein the computer system further comprises non-volatile memory and the method further comprises:
(g) controlling the federated bean to enable a data write cache by instructing the interface layer to intercept requests to write data to the storage device and to write the data to the non-volatile memory.

7. The method of claim 6 further comprising:
(h) enabling a flusher thread to periodically copy data in the non-volatile memory to the storage device.

8. The method of claim 7 wherein step (h) comprises enabling a plurality of flusher threads wherein the number of enabled flusher threads is determined by the federated bean.

9. The method of claim 6 further comprising:
(i) using the federated bean to disable the write cache.

10. The method of claim 6 further comprising:
(j) using the federated bean to set characteristics of the write cache.

11. Apparatus for managing a data caching service from a management terminal in a distributed computer system having a host computer system with a host memory and at least one storage device connected to the computer system by driver software, the apparatus comprising:
an interface layer inserted between the driver software and the storage device, the interface layer exporting a platform dependent API comprising a plurality of API methods that can be called to control data passing between the driver software and the storage device;
management facade software that runs in the host computer system and receives calls to platform-independent methods and generates at least one API method call to the interface layer in order to execute the platform-independent method calls;
a federated bean that runs in the host computer system and generates platform-independent method calls to the management facade software to control the interface layer via the plurality of API methods; and
a presentation program that controls the federated bean to enable a data read cache by instructing the interface layer to intercept requests for data from the storage device and, if the data is in the host memory, to retrieve the data from the host memory, and to retrieve the data from the storage device if the data is not in the host memory.

12. The apparatus of claim 11 wherein the presentation program comprises a command line interface.

13. The apparatus of claim 11 wherein the presentation program comprises a graphical user interface.

14. The apparatus of claim 11 wherein the presentation program controls the federated bean to disable the read cache.

15. The apparatus of claim 11 wherein the presentation program controls the federated bean to set characteristics of the read cache.

16. The apparatus of claim 11 wherein the computer system further comprises non-volatile memory and wherein the federated bean comprises methods that enable a data write cache by instructing the interface layer to intercept requests to write data to the storage device and to write the data to the non-volatile memory.

17. The apparatus of claim 16 further comprising a flusher thread that periodically copies data in the non-volatile memory to the storage device.

18. The apparatus of claim 17 further comprising a plurality of flusher threads wherein the number of enabled flusher threads is determined by the federated bean.

19. The apparatus of claim 16 wherein the federated bean comprises methods that disable the write cache.

20. The apparatus of claim 16 wherein the federated bean comprises methods that set characteristics of the write cache.

21. A computer program product for managing a data caching service from a management terminal in a distributed computer system having a host computer system with a host memory and at least one storage device connected to the computer system by driver software, the computer program product comprising a computer usable medium having computer readable program code thereon, including:
an interface layer inserted between the driver software and the storage device, the interface layer exporting a platform dependent API comprising a plurality of API methods that can be called in order to control data passing between the driver software and the storage device;
management facade software that runs in the host computer system and receives calls to platform-independent methods and generates at least one API method call to the interface layer in order to execute the platform-independent method calls;
federated bean software that runs in the host computer system and generates platform-independent method calls to the management facade software to control the interface layer via the plurality of API methods; and
a presentation program that controls the federated bean to enable a data read cache by instructing the interface layer to intercept requests for data from the storage device and, if the data is in the host memory, to retrieve the data from the host memory, and to retrieve the data from the storage device if the data is not in the host memory.

22. The computer program product of claim 21 wherein the computer system further comprises non-volatile memory and wherein the federated bean comprises methods that enable a data write cache by instructing the interface layer to intercept requests to write data to the storage device and to write the data to the non-volatile memory.

23. The computer program product of claim 22 further comprising program code that creates a flusher thread that periodically copies data in the non-volatile memory to the storage device.

24. The computer program product of claim 23 further comprising program code for creating a plurality of flusher threads wherein the number of enabled flusher threads is determined by the federated bean.

25. A computer program stored in a computer readable device for managing a data caching service from a management terminal in a distributed computer system having a host computer system with a host memory and at least one storage device connected to the computer system by driver software, the computer program comprising:
program code for creating an interface layer inserted between the driver software and the storage device, the interface layer exporting a platform dependent API comprising a plurality of API methods than can be called to control data passing between the driver software and the storage device;

management facade software that runs in the host computer system and receives calls to platform-independent methods and generates at least one API method call to the interface layer in order to execute the platform-independent method calls;

federated bean software that runs in the host computer system and generates method calls to the management facade software to control the interface layer via the plurality of API methods; and a presentation program that controls the federated bean to enable the data read cache by instructing the interface layer to intercept requests for data from the storage device and, if the data is in the host memory, to retrieve the data from the host memory, and to retrieve the data from the storage device if the data is not in the host memory.

* * * * *